United States Patent
Meschenmoser

(10) Patent No.: US 8,457,886 B2
(45) Date of Patent: Jun. 4, 2013

(54) METHOD FOR OPERATING A NAVIGATION SYSTEM

(75) Inventor: Reinhard Meschenmoser, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 194 days.

(21) Appl. No.: 12/733,990

(22) PCT Filed: Sep. 11, 2008

(86) PCT No.: PCT/EP2008/062073
§ 371 (c)(1),
(2), (4) Date: Jul. 28, 2010

(87) PCT Pub. No.: WO2009/047077
PCT Pub. Date: Apr. 16, 2009

(65) Prior Publication Data
US 2010/0286903 A1  Nov. 11, 2010

(30) Foreign Application Priority Data
Oct. 8, 2007 (DE) .......................... 10 2007 048 264

(51) Int. Cl.
*G01C 21/32* (2006.01)
(52) U.S. Cl.
USPC .......................................... 701/452; 701/450
(58) Field of Classification Search
USPC .......................................... 701/200, 450–453
See application file for complete search history.

(56) References Cited

U.S. PATENT DOCUMENTS

| 6,766,248 | B2 * | 7/2004 | Miyahara ...................... 701/532 |
| 6,937,936 | B2 * | 8/2005 | Nimura ........................ 701/421 |
| 7,133,773 | B2 * | 11/2006 | Hamaguchi et al. .......... 701/532 |
| 7,395,150 | B2 * | 7/2008 | Ohira et al. .................... 701/450 |
| 7,577,515 | B2 * | 8/2009 | Nomura ........................ 701/450 |
| 7,584,049 | B2 * | 9/2009 | Nomura ........................ 701/425 |
| 7,688,228 | B2 * | 3/2010 | Tanizaki et al. .......... 340/995.12 |
| 8,051,051 | B2 * | 11/2011 | Nomura ........................ 707/694 |
| 8,055,621 | B2 * | 11/2011 | Nakamura et al. ............. 707/638 |
| 2007/0244636 | A1 * | 10/2007 | Horikami ....................... 701/208 |

FOREIGN PATENT DOCUMENTS

| DE | 10 2005 029 744 |   | 12/2006 |
| DE | 10 2006 013 297 |   | 9/2007 |
| EP |     1770366 A1 | * | 4/2007 |
| EP |     1 786 968 |   | 5/2007 |
| EP |     1944576 A2 | * | 7/2008 |
| JP |  2005140582 A | * | 6/2005 |
| JP |  2007132711 A | * | 5/2007 |

OTHER PUBLICATIONS

JPO machine translation of JP2005-140582.*
EPO machine translation of DE 102005029744.*

* cited by examiner

*Primary Examiner* — James Trammell
*Assistant Examiner* — David Testardi
(74) *Attorney, Agent, or Firm* — Kenyon & Kenyon LLP

(57) ABSTRACT

A device and a method for operating a navigation system having a data receiving device and a memory, map data of a map being stored in the memory, and when updated map data are received, these are entered, the map data being hierarchically organized and information being assigned to the map data regarding the update version of the map data.

7 Claims, 1 Drawing Sheet

METHOD FOR OPERATING A NAVIGATION SYSTEM

FIELD OF THE INVENTION

The present invention relates to a navigation system and a method for operating a navigation system in which maps, which may be digital maps, are used.

BACKGROUND INFORMATION

In navigation systems for motor vehicles, digital maps are used to input destinations and to guide the driver of the vehicle to a defined destination via a route guidance, for example. The digital maps used for this purpose have roads that are represented by so-called segments. Such segments may be made up of a line element or of a plurality of line elements, which may be straight, for example, whereby the route of a segment approximates the actual route of the road. If the segments meet at an intersection or a junction, these meeting points are represented by so-called nodes.

Because road routings may change or roads may be newly built, it is essential to keep the maps that are in use up-to-date and to update the road topology of the map, which is represented by segments and nodes. An update through wireless methods, such as via bidirectional communication networks, has the disadvantage that the available transmission capacity is only limited and the general availability of such systems also is not always guaranteed. Thus, it is necessary for the wireless updating of the map to be restricted to a currently required region of the map only. In this context, however, a situation may occur in which the updated digital map has an inconsistency at the border between an updated region and a non-updated region. For example, such an inconsistency may be a new road that leads across the border of the regions and is not yet included in the region that has not yet been updated and thus is not continued there. If a navigation system now proposes a suggested route via a segment representing such a street, then problems result at the border between updated and non-updated regions, because the road suddenly ends at the border between the updated region and the non-updated region.

In known concepts, such as in the European project Act-Map, it is assumed that the digital maps are updated to the point where a consistent calculation of a route is possible.

The not yet pre-published DE 10 2006 013 297 discloses a method for operating a navigation system in which map data are updated, the updated map data being stored in a memory and additionally map data that have not yet been updated being stored in a safety memory level, so that it is possible to revert to these data, where necessary. The update is performed using bidirectional communication, which is not always available and which is not available everywhere.

However, wireless communication channels for updating digital maps do not have one-hundred-percent availability, and when a communication channel is not available, it is not possible to update the digital map to the necessary extent, and for this reason a calculation of such a route could be impossible or problematic.

SUMMARY OF THE INVENTION

An object of the exemplary embodiments and/or exemplary methods of the present invention is to create a method for operating a navigation system, and a device, that is or that are improved in comparison with the related art and that allows for an improvement with regard to updating data.

According to the exemplary embodiments and/or exemplary methods of the present invention, the objective relating to the method is achieved by the features of claim 1 and, as it relates to the device, by the features of claim 5.

With regard to the method, this is achieved by a method for operating a navigation system having a data receiving device and a memory, map data of a map being stored in the memory, and when updated map data are received, they are entered into the memory, the map data being hierarchically organized and information regarding the update version of the map data being assigned to the map data.

In this context, it is advantageous for the map data of the map to be divided into regions, such as page frames, that are hierarchically structured, and for page frames of a lower hierarchy level and page frames of a higher hierarchy level to exist, a plurality of page frames of a lower hierarchy level being assigned to a page frame of a higher hierarchy level.

When map data of a page frame in a lower hierarchy level are updated, it is particularly advantageous if the page frame of the higher hierarchy level receives the information regarding the update version of the map data via which the page frame of the lower hierarchy level has been updated, the updated page frame of the lower level receiving information to the effect that it has been updated to the update version of the page frame of the higher level.

When map data of at least one page frame in a lower hierarchy level is updated, it is also particularly advantageous if the page frame of a higher hierarchy level receives the information regarding the highest or the latest update version of the map data via which at least one page frame of the lower hierarchy level has been updated, the page frames of the lower level receiving information regarding whether they have been updated to the update version of the page frame of the higher level.

With regard to the device, this is achieved by a device, such as a navigation system, having a data receiving device and a memory, map data of a map being storable in the memory, and when updated map data are received, they are able to be entered into the memory, the map data being hierarchically organizable, and it being possible to assign information regarding the update version of the map data to the map data. In this context, it is advantageous if the device is suitable for carrying out an above method.

Advantageous refinements are described herein. On the basis of an exemplary embodiment, the present invention is explained below in greater detail, with the aid of the drawing.

DETAILED DESCRIPTION

For example, navigation systems 100 use digital maps to calculate routes to reach a selected destination point, starting from a current coordinate point of a vehicle in the map, for example. However, such navigation systems may also be used by two-wheel vehicles or pedestrians, for example. To this end, a destination coordinate is input or defined and with the aid of the current coordinates the navigation system determines the most suitable route to the destination coordinate, in view of possibly specified additional marginal conditions, using an available map, for example, a digital map. This route may then be achieved via a route guidance.

In this context, the currentness of the maps used is essential, so that the most current roads may be accessed in the route calculation. Due to constant changes, for example, due to road construction or other traffic policy measures, it is therefore advantageous to perform a regular or need-based update for the maps used in navigation system 100.

A digital map may be updated in that segments representing individual roads or nodes representing points of intersection or junctions of roads are updated at least in some regions. It may also be advantageous that the map is divided into individual regions and these regions, which may be in the form of page frames, such as in the form of rectangular page frames, are able to be updated in a corresponding manner. On the whole, such updatable data of a map are referred to as map data.

When maps are divided into a plurality of regions, which are referred to as page frames in the following, such regions or page frames may have a hierarchical structure. In this context, page frames on a lower hierarchy level may be grouped together into a larger page frame in a superposed hierarchy level. For example, in a lower hierarchy level the page frames are divided such that they cover the map or the surface representing the map, such as the earth's surface or a section of it, identical page frames or also page frames having different sizes being used, which may meet at segments of the page frames. A certain overlapping of page frames could also be provided. In a next, higher hierarchy level, a plurality of page frames of the hierarchy level situated below may then be grouped together.

Figure 1:
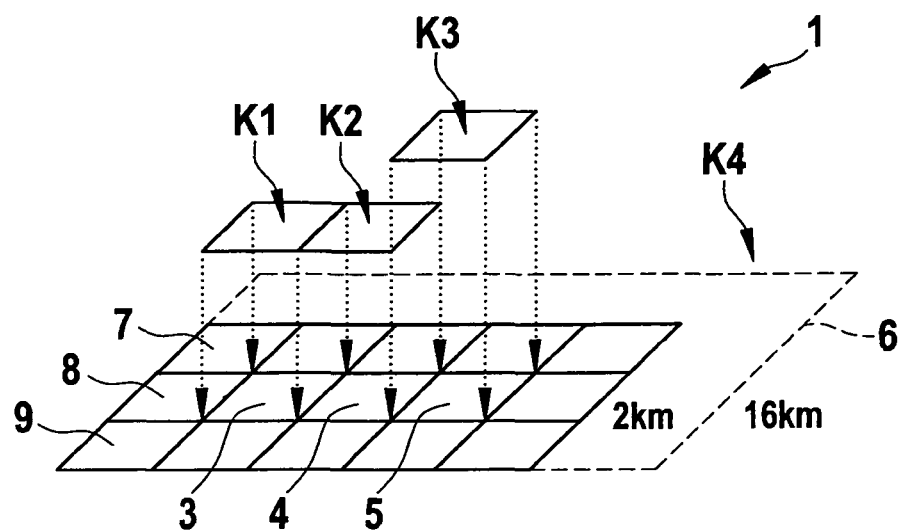
FIG. 1 shows a schematic representation of a digital map.

FIG. 1 shows a digital map or a section of a map 1. In this context, map 1 has individual regions or page frames 3, 4, 5, 6, 7, 8 and 9. Page frames 3, 4, 5, 7, 8 and 9 are part of a larger page frame 6, which is also labeled K4, which includes a number of smaller page frames. Page frame 6 is a page frame of the higher hierarchy level, page frames 3, 4, 5, 7, 8, and 9 being page frames of the lower hierarchy level.

In this context, digital map 1 may exist in an operational level, and possibly also in a safety memory level. Digital map 1 of the operational level, for example, is used to calculate a route and/or to display a map on a display element by utilizing the roads or nodes existing in the map. The operational level thus constitutes a memory level that is called up for the general operation of the navigation system and from which data are called up.

If the real situation relating to the usable roads has changed, for example, due to new construction of a road or a demolition or conversion of a road, it becomes necessary to update digital map 1 by correspondingly including the changed region or the changed road/intersection or the like in the digital map.

For example, map 1 constitutes a map that is completely updated and exists in a version X. In the exemplary embodiment of FIG. 1, map 1 is available in a version 1, all page frames 3, 4, 5, 6, 7, 8 and 9 of this map 1 existing in this version 1. For example, version 1 or version X is available upon installation of the map on a navigation device, or it may also be called up with a new installation of a digital map. A version X may also be available upon a complete update of the map.

However, if an update of the map becomes necessary after a certain time and is implemented, the entire map is not updated automatically, but rather only individual page frames are updated that are necessary at the time of the update or are defined as such, that is, those that are required for the current route calculation or map representation on a screen, for example. Additionally, it is possible for individual page frames to be updated in an update and to be updated once more in a next update, whereby also some neighboring page frames that were already updated in the former update may not be taken into account in this next update.

Thus, FIG. 1 shows that page frames 3 and 4 are already available in version 3 (K1, K2), that is, were updated at a time at which version 3 of map 1 existed. Moreover, page frame 5 (K3) was updated with a data set of version 4. The remaining regions or page frames 7, 8, 9 of map 1 were not updated yet, for example.

This results in a digital map provided with, or made up of, regions or page frames 3, 4, 5, 7, 8, 9, which belong to different versions or update levels.

Thus, in the example of FIG. 1, the map is available having most page frames 7, 8, 9 in version 1, individual page frames 3, 4 (K1, K2) belonging to a version 3, and another page frame 5, (K3) belonging to a version 4.

Additionally, it can be seen that page frames having different hierarchy levels exist. Thus, a page frame K4 exists, which is made up of a number N of page frames having a smaller size and a lower hierarchy level. Thus, in the exemplary embodiment of FIG. 1, page frame K4, 6 is made up of 24 page frames of the lower hierarchy level, such as an arrangement of four rows having six page frames, respectively. The page frames of the higher hierarchy level may also be designed to have a square form and feature four times four page frames of the lower hierarchy level.

It can be seen that not all page frames 3, 4, 5, 7, 8, 9, etc., that comprise page frame K4, 6 are at the same update level. Thus, page frames of update version 1, of version 3, and of version 4 are to be found in page frame K4, for example.

Because the highest update version used to update a page frame allocated under page frame K4, 6 in the hierarchy is version 4, version 4 is also assigned to page frame K4, 6.

However, to indicate which of the hierarchically subordinate page frames are at highest update version 4 nevertheless, a reference or a suffix or information, such as a file flag, for example, is assigned to this page frame or these page frames, which indicates whether the hierarchically subordinate page frame features the version of the hierarchically superordinate page frame. If this is the case, the flag is set; otherwise, it is not.

Thus, the page frame that is higher in the hierarchy always has the version identifier of the highest version of one of its hierarchically subordinate page frames.

When the map is updated completely or a hierarchically superordinate page frame is updated completely, all hierarchically subordinate page frames are raised to the same update level of the same version and all flags or indications of the version information are deleted.

In principle, the page frames could also feature data information about the update version. However, this would result in a higher memory requirement.

Figure 2:
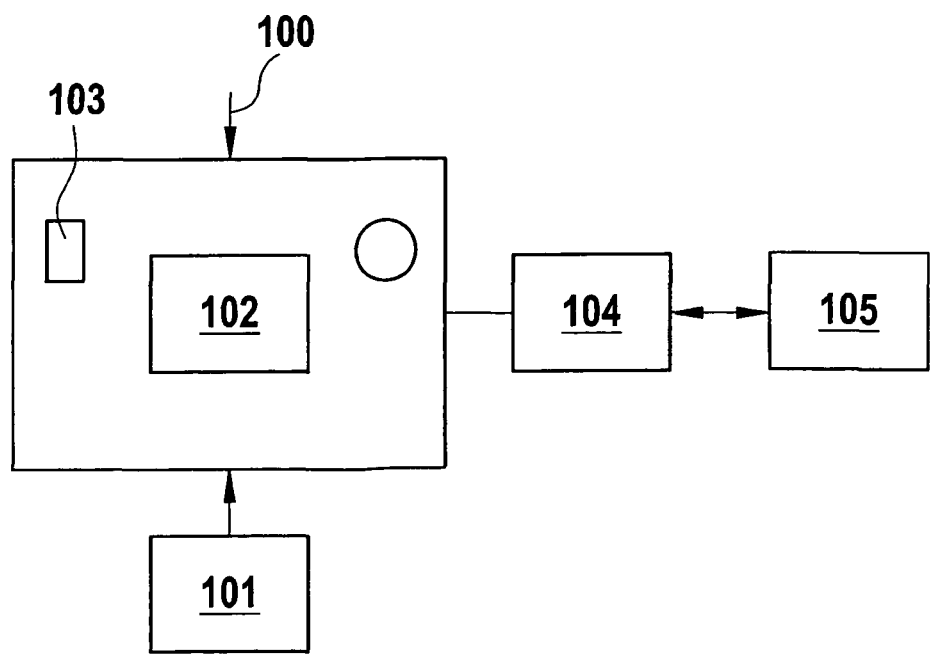
FIG. 2 shows a schematic representation of a navigation system.

FIG. 2 shows a navigation system 100 in a schematic representation, having a memory 101, a display element 102, and at least one operating element 103. Navigation system 100 may display map representations on display element 102, it being possible to display calculated routes in a map representation. Furthermore, navigation system 100 has a data receiving device 104. This data receiving device may interact with a transmitter 105, such as a data server, whereby the signals transmitted by the transmitter may be received and further processed. For example, such signals may be map data. A telephone communication device or the like may also be used as a data receiving device.

Navigation system 100 has a digital map 1 stored in its memory 101, on the basis of which route proposals are determined on the operational level, for example. Navigation system 100 is able to receive map data or regions or page frames of maps in updated form via data receiving device 104, and these received map data may replace those of the digital map 1 that are already stored.

What is claimed is:

1. A method implemented on a navigation system that includes a data receiving device and a memory device, map data of a map being stored in the memory device, wherein the map data (i) are hierarchically organized into at least two hierarchy levels, the levels including a low hierarchy level and a high hierarchy level higher than the low hierarchy level, and (ii) includes a plurality of page frames assigned to (a) the low hierarchy level and (b) a page frame that is assigned to the high hierarchy level, the method comprising:
 receiving, via the receiving device, updated map data that is assigned an update version identification;
 responsive to the receipt of the updated map data:
  updating, by a processor of the navigation system and in the memory device, at least one of the plurality of page frames of the low hierarchy level using the updated map data; and
  selectively assigning, by the processor, the update version identification of the received updated map data to each of the at least one of the plurality of page frames of the low hierarchy level that have been updated; and
 responsive to the updating of the at least one of the plurality of page frames of the low hierarchy level, assigning the update version identification, that is assigned to the each of the at least one of the plurality of page frames of the low hierarchy level that have been updated, to the page frame of the high hierarchy level to which the at least one of the plurality of page frames of the low hierarchy level is assigned.

2. The method of claim 1, wherein each of the page frames corresponds to a respective region of the map.

3. The method of claim 1, further comprising:
 for each of the page frames of the low hierarchy level that are assigned to the page frame of the high hierarchy level, setting a respectively assigned flag to indicate whether the respective page frame is assigned the update version assigned to the page frame of the high hierarchy level.

4. The method of claim 1, wherein the at least one of the plurality of page frames of the low hierarchy level includes fewer than all of the plurality of page frames of the low hierarchy level, others of the plurality of page frames not being updated responsive to the received updated map data, such that, based on the assigning steps, the update version assigned to the at least one of the plurality of page frames of the low hierarchy level and the page frame of the high hierarchy level is different than an update version assigned to the others of the plurality of page frames that are assigned to the page frame of the high hierarchy level.

5. A navigation system, comprising:
 a memory device that stores map data of a map, wherein the map data (i) are hierarchically organized into at least two hierarchy levels, the levels including a low hierarchy level and a high hierarchy level higher than the low hierarchy level, and (ii) includes a plurality of page frames assigned to (a) the low hierarchy level and (b) a page frame that is assigned to the high hierarchy level;
 a data receiving device adapted for receiving updated map data that is assigned an update version identification; and
 a processor configured to:
  responsive to the receipt of the updated map data:
   update in the memory device at least one of the plurality of page frames of the low hierarchy level using the updated map data; and
   selectively assign the update version identification of the received updated map data to each of the at least one of the plurality of page frames of the low hierarchy level that have been updated; and
  responsive to the update of the at least one of the plurality of page frames of the low hierarchy level, assign the update version identification, that is assigned to the each of the at least one of the plurality of page frames of the low hierarchy level that have been updated, to the page frame of the high hierarchy level to which the at least one of the plurality of page frames of the low hierarchy level is assigned.

6. The navigation system of claim 5, wherein the processor is configured to:
 for each of the page frames of the low hierarchy level that are assigned to the page frame of the high hierarchy level, set a respectively assigned flag to indicate whether the respective page frame is assigned the update version assigned to the page frame of the high hierarchy level.

7. The navigation system of claim 5, wherein the at least one of the plurality of page frames of the low hierarchy level includes fewer than all of the plurality of page frames of the low hierarchy level, others of the plurality of page frames not being updated responsive to the received updated map data, such that, based on the selective assignment and the assignment responsive to the updating of the at least one of the plurality of page frames, the update version assigned to the at least one of the plurality of page frames of the low hierarchy level and the page frame of the high hierarchy level is different than an update version assigned to the others of the plurality of page frames that are assigned to the page frame of the high hierarchy level.

* * * * *

UNITED STATES PATENT AND TRADEMARK OFFICE
CERTIFICATE OF CORRECTION

PATENT NO.       : 8,457,886 B2                                                                 Page 1 of 1
APPLICATION NO. : 12/733990
DATED            : June 4, 2013
INVENTOR(S)      : Reinhard Meschenmoser It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 308 days.

Signed and Sealed this

Eighth Day of September, 2015

Michelle K. Lee
*Director of the United States Patent and Trademark Office*